United States Patent
Inoue et al.

(10) Patent No.: US 10,358,184 B2
(45) Date of Patent: Jul. 23, 2019

(54) BICYCLE PEDAL

(71) Applicant: SHIMANO INC., Sakai (JP)

(72) Inventors: Akira Inoue, Sakai (JP); Takuro Yamane, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/662,294

(22) Filed: Jul. 28, 2017

(65) Prior Publication Data

US 2019/0031281 A1    Jan. 31, 2019

(51) Int. Cl.
*B62M 3/08*    (2006.01)
*F16C 19/18*    (2006.01)
*F16C 19/56*    (2006.01)

(52) U.S. Cl.
CPC ............. *B62M 3/08* (2013.01); *F16C 19/183* (2013.01); *F16C 19/184* (2013.01); *F16C 19/56* (2013.01); *F16C 2326/28* (2013.01)

(58) Field of Classification Search
CPC ..... B62M 3/08; B62M 3/086; Y10T 74/2168; F16C 19/56; F16C 19/183; F16C 19/184
See application file for complete search history.

(56) References Cited

U.S. PATENT DOCUMENTS

| | | | | |
|---|---|---|---|---|
| 4,080,017 A | * | 3/1978 | Meyer | B62M 3/08 280/294 |
| 4,335,628 A | * | 6/1982 | Shimano | B62M 3/08 74/560 |
| 4,838,115 A | * | 6/1989 | Nagano | B62M 3/08 74/594.4 |
| 5,379,665 A | * | 1/1995 | Nagano | B62M 3/08 384/512 |
| 6,227,071 B1 | * | 5/2001 | Coombe | B62M 3/08 384/454 |
| 6,745,643 B2 | | 6/2004 | Lubanski | |
| 7,418,862 B2 | * | 9/2008 | Gruben | B62M 3/08 482/8 |

FOREIGN PATENT DOCUMENTS

| | | | |
|---|---|---|---|
| JP | 57-007587 Y2 | 5/1980 | |
| JP | 58-055107 Y2 | 7/1980 | |

* cited by examiner

*Primary Examiner* — Luis A Gonzalez
(74) *Attorney, Agent, or Firm* — Mori & Ward, LLP

(57) ABSTRACT

A bicycle pedal comprises a pedal axle, a pedal body, and a cantilever bearing structure. The cantilever bearing structure is rotatably coupling the pedal body to the pedal axle about a rotational axis. The cantilever bearing structure comprises a first bearing and a second bearing. The first bearing has at least two rows. The first thrust load ratio is larger than the first radial load ratio. The second bearing has at least one row. The second bearing has a second radial load ratio and a second thrust load ratio. The second radial load ratio is larger than the second thrust load ratio.

30 Claims, 13 Drawing Sheets

BICYCLE PEDAL

BACKGROUND OF THE INVENTION

Field of the Invention

The present invention relates to a bicycle pedal.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a pedal.

SUMMARY OF THE INVENTION

In accordance with a first aspect of the present invention, a bicycle pedal comprises a pedal axle, a pedal body, and a cantilever bearing structure. The pedal axle includes a first axle end configured to be secured to a crank arm. The pedal body includes a tread surface. The cantilever bearing structure is rotatably coupling the pedal body to the pedal axle about a rotational axis. The cantilever bearing structure is provided closer to the first axle end than the tread surface along the rotational axis. The cantilever bearing structure comprises a first bearing and a second bearing. The first bearing has at least two rows. The first bearing has a first radial load ratio and a first thrust load ratio. The first radial load ratio is defined in a radial direction perpendicular to the rotational axis. The first thrust load ratio is defined in an axial direction parallel to the rotational axis. The first thrust load ratio is larger than the first radial load ratio. The second bearing has at least one row. The second bearing has a second radial load ratio and a second thrust load ratio. The second radial load ratio is defined in the radial direction. The second thrust load ratio is defined in the axial direction. The second radial load ratio is larger than the second thrust load ratio.

With the bicycle pedal according to the first aspect, the cantilever bearing structure maintains or increases an allowable tread force with simplifying the structure of the bicycle pedal.

In accordance with a second aspect of the present invention, a bicycle pedal comprises a pedal axle, a pedal body, and a thrust support member. The pedal body is rotatably coupled to the pedal axle. The thrust support member is coupled to one of the pedal axle and the pedal body to be contactable with the other of the pedal axle and the pedal body during pedaling.

With the bicycle pedal according to the second aspect, the thrust support member maintains or increases an allowable tread force with simplifying the structure of the bicycle pedal.

In accordance with a third aspect of the present invention, a bicycle pedal comprises a pedal axle, a pedal body, a bearing structure. The bearing structure rotatably couples the pedal body to the pedal axle about a rotational axis. The bearing structure comprises a first bearing and a second bearing. The first bearing has a first radial load ratio and a first thrust load ratio. The first radial load ratio is defined in a radial direction perpendicular to the rotational axis. The first thrust load ratio is defined in an axial direction parallel to the rotational axis. A ratio of the first thrust load ratio to the first radial load ratio is equal to or higher than 2.5. The second bearing has a second radial load ratio and a second thrust load ratio. The second radial load ratio is defined in the radial direction. The second thrust load ratio is defined in the axial direction. A ratio of the second radial load ratio to the second thrust load ratio is equal to or higher than 2.

With the bicycle pedal according to the third aspect, the cantilever bearing structure maintains or increases an allowable tread force with simplifying the structure of the bicycle pedal.

In accordance with a fourth aspect of the present invention, the bicycle pedal according to any one of the first to third aspects is configured so that the first bearing has two rows.

With the bicycle pedal according to the fourth aspect, the cantilever bearing structure maintains or increases the allowable tread force with further simplifying the structure of the bicycle pedal.

In accordance with a fifth aspect of the present invention, the bicycle pedal according to any one of the first to fourth aspects is configured so that the second bearing includes a needle bearing having at least one row.

With the bicycle pedal according to the fifth aspect, the cantilever bearing structure maintains or increases the allowable tread force with further simplifying the structure of the bicycle pedal.

In accordance with a sixth aspect of the present invention, the bicycle pedal according to any one of the first to fifth aspects is configured so that at least part of the first bearing is provided radially outwardly of the second bearing.

With the bicycle pedal according to the sixth aspect, the cantilever bearing structure effectively maintains or increases the allowable tread force with simplifying the structure of the bicycle pedal.

In accordance with a seventh aspect of the present invention, the bicycle pedal according to any one of the first to sixth aspects is configured so that the second bearing includes first radial rolling elements, a first radial receiving surface, and a first additional radial receiving surface. The first radial receiving surface is provided on the pedal body. The first additional radial receiving surface is provided on the pedal axle and provided radially inwardly of the first radial receiving surface. The first radial rolling elements are provided between the first radial receiving surface and the first additional radial receiving surface.

With the bicycle pedal according to the seventh aspect, the second bearing effectively receives a radial force caused by the tread force.

In accordance with an eighth aspect of the present invention, the bicycle pedal according to the seventh aspect is configured so that each of the first radial receiving surface and the first additional radial receiving surface is provided closer to the first axle end than the tread surface along the rotational axis.

With the bicycle pedal according to the eighth aspect, the cantilever bearing structure effectively maintains or increases the allowable tread force with simplifying the structure of the bicycle pedal.

In accordance with a ninth aspect of the present invention, the bicycle pedal according to the seventh or eighth aspect is configured so that the pedal body includes a bearing support. The first radial receiving surface is provided on the bearing support. The bearing support is provided radially between the first bearing and the second bearing With the bicycle pedal according to the ninth aspect, the cantilever bearing structure effectively maintains or increases the allowable tread force with simplifying the structure of the bicycle pedal.

In accordance with a tenth aspect of the present invention, the bicycle pedal according to the ninth aspect is configured so that the first bearing includes first thrust rolling elements, a first thrust receiving surface, and a first additional thrust receiving surface. The pedal body includes a first thrust receiving part extending radially outwardly from the bearing support. The first thrust receiving surface is provided on the first thrust receiving part. The first thrust rolling elements constitutes a single row and contacts the first thrust receiving surface.

With the bicycle pedal according to the tenth aspect, the first bearing effectively receives a thrust force caused by the tread force.

In accordance with an eleventh aspect of the present invention, the bicycle pedal according to the tenth aspect is configured so that the first bearing includes second thrust rolling elements, a second thrust receiving surface, and a second additional thrust receiving surface. The second thrust receiving surface is provided on the first thrust receiving part. The second thrust rolling elements constitutes a single row and contacts the second thrust receiving surface.

With the bicycle pedal according to the eleventh aspect, the first bearing more effectively receives the thrust force caused by the tread force.

In accordance with a twelfth aspect of the present invention, the bicycle pedal according to the eleventh aspect is configured so that the first additional thrust receiving surface and the second additional thrust receiving surface are provided on the pedal axle.

With the bicycle pedal according to the twelfth aspect, the first bearing more effectively receives the thrust force caused by the tread force.

In accordance with a thirteenth aspect of the present invention, the bicycle pedal according to the twelfth aspect is configured so that the pedal axle includes a second thrust receiving part provided radially outwardly of the first bearing.

With the bicycle pedal according to the thirteenth aspect, the first bearing more effectively receives the thrust force caused by the tread force with simplifying the structure of the bicycle pedal.

In accordance with a fourteenth aspect of the present invention, the bicycle pedal according to the thirteenth aspect is configured so that the pedal axle includes an axle body including the first axle end. The second thrust receiving part extends radially outwardly from the axle body.

With the bicycle pedal according to the fourteenth aspect, the first bearing more effectively receives the thrust force caused by the tread force with further simplifying the structure of the bicycle pedal.

In accordance with a fifteenth aspect of the present invention, the bicycle pedal according to the thirteenth or fourteenth aspect is configured so that the first additional thrust receiving surface and the second additional thrust receiving surface are provided on the second thrust receiving part.

With the bicycle pedal according to the fifteenth aspect, the first bearing more effectively receives the thrust force caused by the tread force with further simplifying the structure of the bicycle pedal.

In accordance with a sixteenth aspect of the present invention, the bicycle pedal according to any one of the first to fifteenth aspects is configured so that the first bearing includes first thrust rolling elements constituting a single row.

With the bicycle pedal according to the sixteenth aspect, the first bearing effectively receives a thrust force caused by the tread force with simplifying the structure of the bicycle pedal.

In accordance with a seventeenth aspect of the present invention, the bicycle pedal according to the sixteenth aspect is configured so that the first bearing includes second thrust rolling elements constituting a single row.

With the bicycle pedal according to the seventeenth aspect, the first bearing more effectively receives the thrust force caused by the tread force with simplifying the structure of the bicycle pedal.

In accordance with an eighteenth aspect of the present invention, the bicycle pedal according to any one of the first to seventeenth aspects is configured so that the second bearing includes first radial rolling elements constituting a single row.

With the bicycle pedal according to the eighteenth aspect, the second bearing effectively receives a radial force caused by the tread force with simplifying the structure of the bicycle pedal.

In accordance with a nineteenth aspect of the present invention, the bicycle pedal according to the eighteenth aspect is configured so that the second bearing includes second radial rolling elements constituting a single row.

With the bicycle pedal according to the nineteenth aspect, the second bearing more effectively receives the radial force caused by the tread force with simplifying the structure of the bicycle pedal.

In accordance with a twentieth aspect of the present invention, the bicycle pedal according to any one of the first to nineteenth aspects is configured so that the first bearing includes a thrust support member attached to one of the pedal axle and the pedal body.

With the bicycle pedal according to the twentieth aspect, the thrust support member effectively receives a thrust force caused by the tread force with simplifying the structure of the bicycle pedal.

In accordance with a twenty-first aspect of the present invention, the bicycle pedal according to the twentieth aspect is configured so that the thrust support member is a separate member from at least one of the pedal axle and the pedal body.

With the bicycle pedal according to the twenty-first aspect, it is possible to improve design freedom of the thrust support member.

In accordance with a twenty-second aspect of the present invention, the bicycle pedal according to the twentieth or twenty-first aspect is configured so that the thrust support member is rotatably coupled to the one of the pedal axle and the pedal body.

With the bicycle pedal according to the twenty-second aspect, it is possible to reduce wear of the thrust support member and/or the one of the pedal axle and the pedal body if the thrust support member is in contact with the one of the pedal axle and the pedal body.

In accordance with a twenty-third aspect of the present invention, the bicycle pedal according to the twenty-second aspect is configured so that the thrust support member is rotatably coupled to the one of the pedal axle and the pedal body about a thrust rotational axis. The thrust rotational axis is non-parallel to the rotational axis.

With the bicycle pedal according to the twenty-third aspect, it is possible to arrange the thrust support member to receive the thrust force effectively.

In accordance with a twenty-fourth aspect of the present invention, the bicycle pedal according to any one of the twentieth to twenty-third aspect is configured so that the thrust support member is rotatably coupled to the pedal body to be contactable with the pedal axle.

With the bicycle pedal according to the twenty-fourth aspect, it is possible to arrange the thrust support member to receive effectively the thrust force caused by the tread force.

In accordance with a twenty-fifth aspect of the present invention, the bicycle pedal according to any one of the twentieth to twenty-fourth aspects is configured so that the thrust support member is spaced apart from the other of the pedal axle and the pedal body in a state where a tread force does not act on the tread surface of the pedal body.

With the bicycle pedal according to the twenty-fifth aspect, it is possible to reduce wear of the thrust support member and/or the other of the pedal axle and the pedal body during pedaling.

In accordance with a twenty-sixth aspect of the present invention, the bicycle pedal according to any one of the twentieth to twenty-fifth aspects is configured so that the thrust support member includes a contactable surface contactable with the other of the pedal axle and the pedal body.

With the bicycle pedal according to the twenty-sixth aspect, the contactable surface effectively receives the thrust force caused by the tread force when the contactable surface contacts the other of the pedal axle and the pedal body.

In accordance with a twenty-seventh aspect of the present invention, the bicycle pedal according to any one of the twentieth to twenty-sixth aspects is configured so that the pedal body includes a first pedal end and a second pedal end. The pedal body extends between the first pedal end and the second pedal end. The first pedal end is closer to the first axle end than the second pedal end.

With the bicycle pedal according to the twenty-seventh aspect, it is possible to effectively arrange the pedal axle and the pedal body.

In accordance with a twenty-eighth aspect of the present invention, the bicycle pedal according to any one of the twentieth to twenty-seventh aspects is configured so that the pedal body includes an additional surface provided on a reverse side of the tread surface. The thrust support member is provided closer to the additional surface than the tread surface.

With the bicycle pedal according to the twenty-eighth aspect, it is possible to utilize an area around the additional surface for the thrust support member.

In accordance with a twenty-ninth aspect of the present invention, the bicycle pedal according to any one of the first to twenty-eighth aspects is configured so that the pedal body includes an additional surface provided on a reverse side of the tread surface. The tread surface is provided between the rotational axis and the additional surface.

With the bicycle pedal according to the twenty-ninth aspect, this arrangement of the tread surface smoothens pedaling.

In accordance with a thirtieth aspect of the present invention, the bicycle pedal according to any one of the first to twenty-ninth aspects is configured so that the pedal body includes an additional surface provided on a reverse side of the tread surface. The pedal body includes a pedal opening extending from the tread surface to the additional surface.

With the bicycle pedal according to the thirtieth aspect, the pedal opening saves weight of the bicycle pedal.

In accordance with a thirty-first aspect of the present invention, the bicycle pedal according to the thirtieth aspect is configured so that the rotational axis is provided on the pedal opening when viewed in a perpendicular direction perpendicular to the tread surface.

With the bicycle pedal according to the thirty-first aspect, this arrangement of the pedal opening enlarges an area of the pedal opening.

In accordance with a thirty-second aspect of the present invention, the bicycle pedal according to any one of the second to thirty-first aspects is configured so that the pedal body includes a second axle end and extends between the first axle end and the second axle end along the rotational axis. The thrust support member is contactable with the second axle end.

With the bicycle pedal according to the thirty-second aspect, the second axle end and the thrust support member effectively receive a thrust force caused by a tread force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
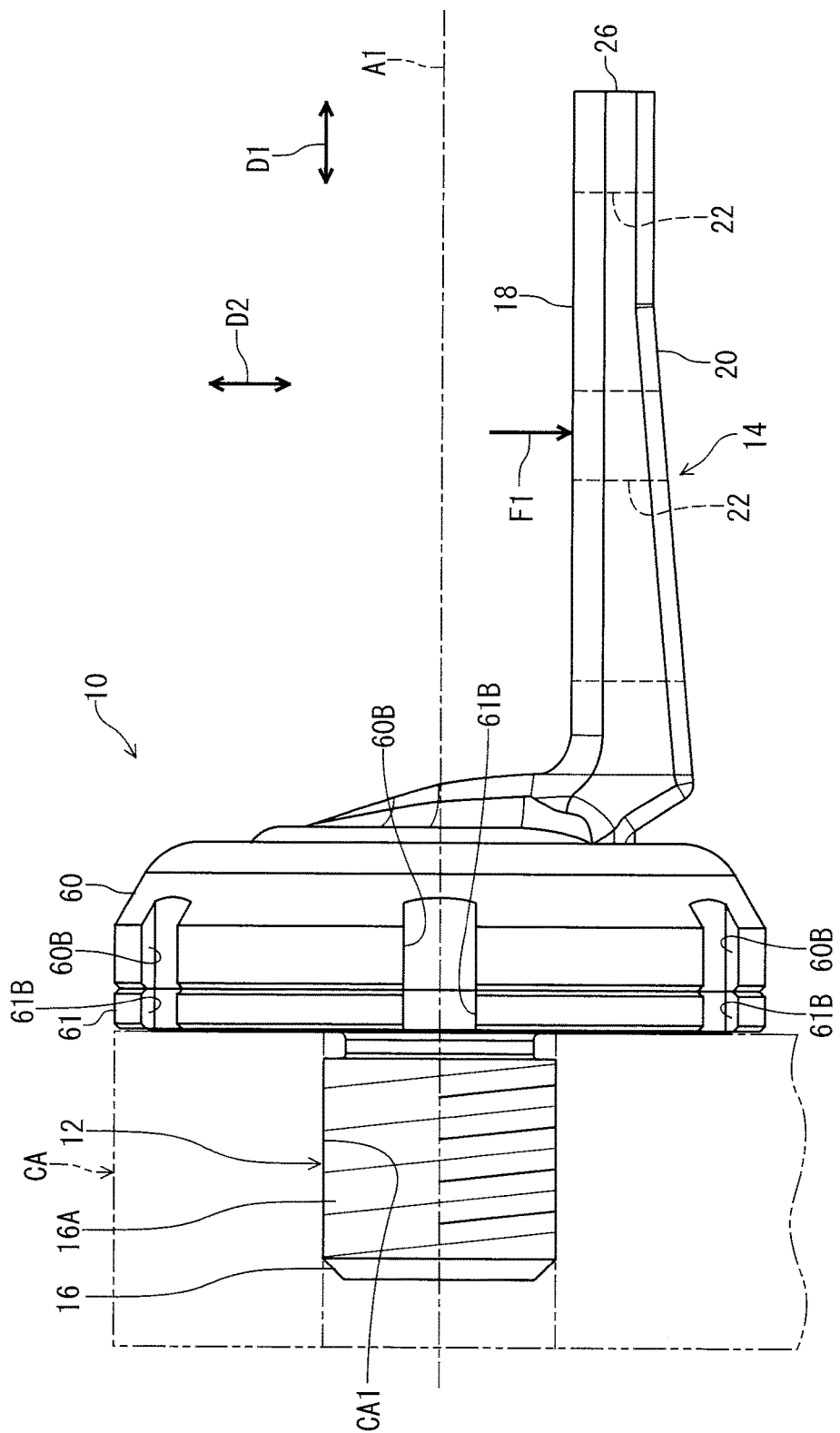
FIG. 1 is a side elevational view of a bicycle pedal in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle pedal 10 in accordance with a first embodiment comprises a pedal axle 12 and a pedal body 14. The pedal axle 12 includes a first axle end 16 configured to be secured to a crank arm CA. The first axle end 16 is configured to be engaged with the crank arm CA. The first axle end 16 includes an externally threaded part 16A threadedly engaged in a threaded hole CA1 of the crank arm CA. In this embodiment, the bicycle pedal 10 is a right pedal, and the crank arm CA is a right crank arm. However, structures of the bicycle pedal 10 can be applied to a left pedal.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle pedal 10, should be interpreted relative to the bicycle equipped with the bicycle pedal 10 as used in an upright riding position on a horizontal surface.

As seen in FIG. 1, the pedal body 14 includes a tread surface 18. The tread surface 18 is a surface on which a shoe (not shown) of a rider is put during pedaling. The tread surface 18 is configured to receive a tread force F1 from the shoe of the rider during pedaling. The pedal body 14 includes an additional surface 20 provided on a reverse side of the tread surface 18.

Figure 2:
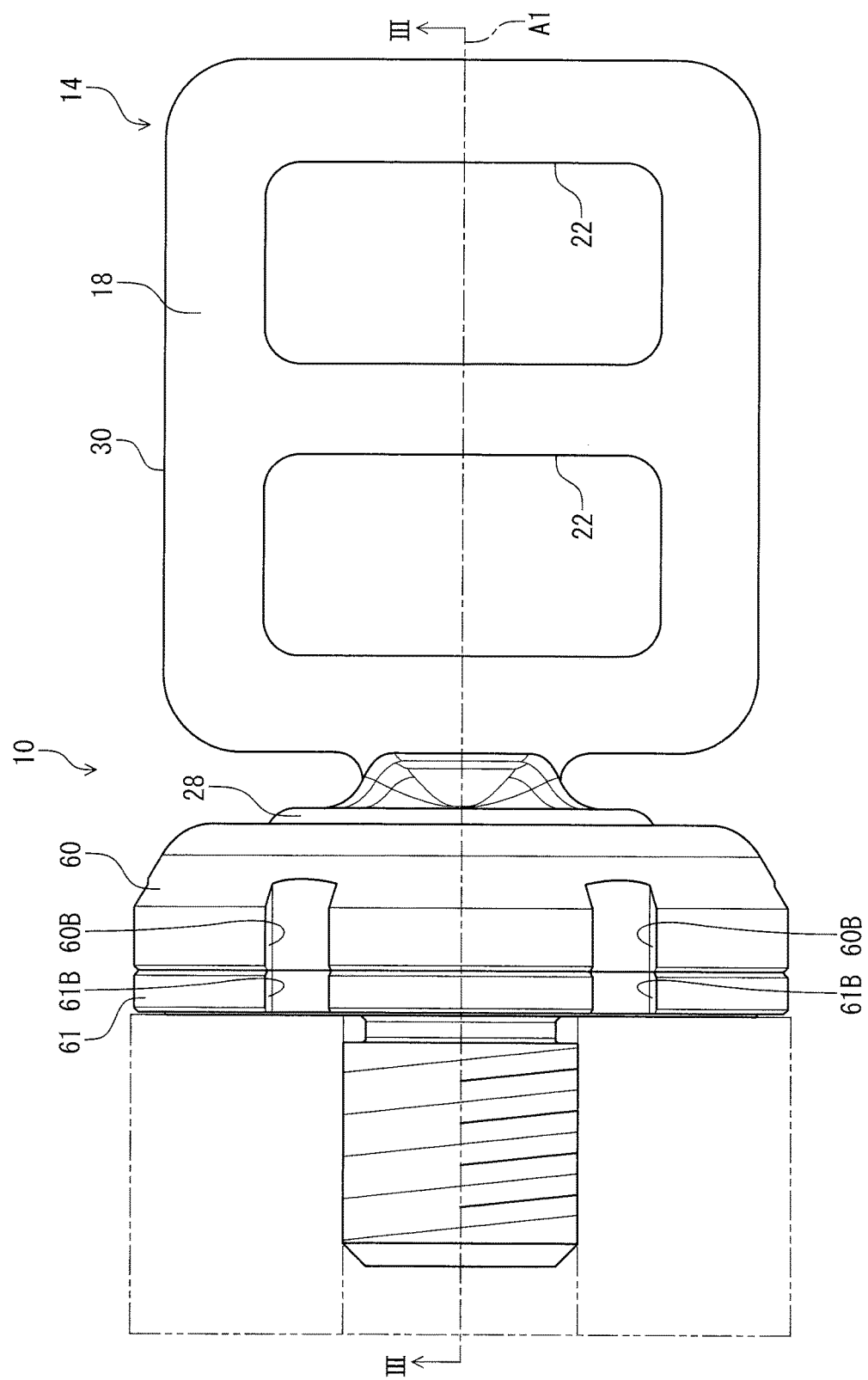
FIG. 2 is a plan view of the bicycle pedal illustrated in FIG. 1.

As seen in FIGS. 1 and 2, the pedal body 14 includes a pedal opening 22. In this embodiment, the pedal body 14 includes pedal openings 22. The pedal opening 22 extends from the tread surface 18 to the additional surface 20. However, at least one of the pedal openings 22 can be omitted from the pedal body 14.

Figure 3:
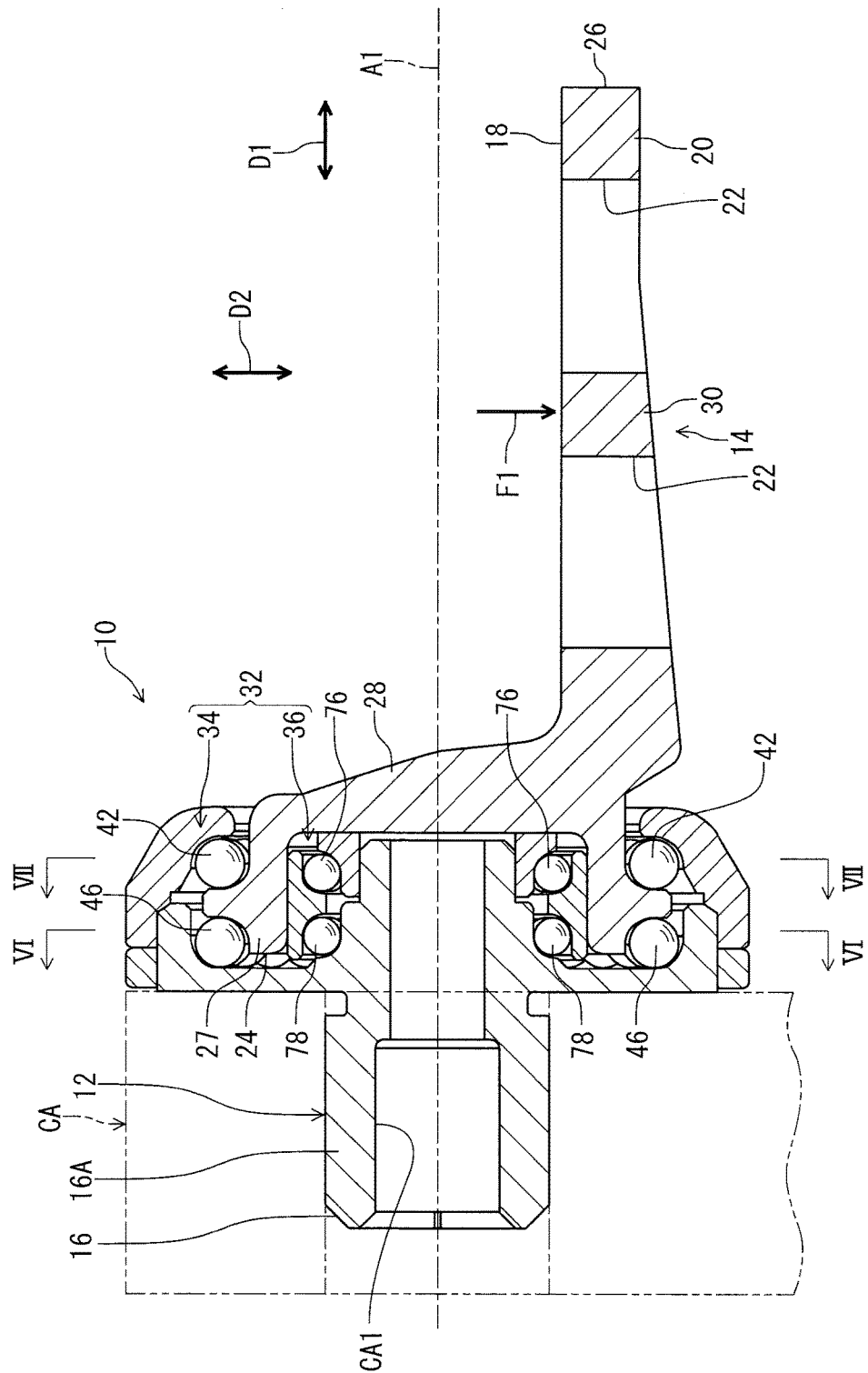
FIG. 3 is a cross-sectional view of the bicycle pedal taken along line of FIG. 2.

As seen in FIG. 3, the pedal body 14 includes a first pedal end 24 and a second pedal end 26. The pedal body 14 extends between the first pedal end 24 and the second pedal end 26. The first pedal end 24 is closer to the first axle end 16 than the second pedal end 26. In this embodiment, the pedal body 14 includes a bearing support 27, a coupling part 28, and a tread part 30. The bearing support 27 has a tubular shape. The bearing support 27 extends from the coupling part 28 in an axial direction D1 parallel to the rotational axis A1. The tread part 30 extends from the coupling part 28 in the axial direction D1. The bearing support 27 includes the first pedal end 24. The tread part 30 includes the tread surface 18, the additional surface 20, and the second pedal end 26.

The bicycle pedal 10 comprises a cantilever bearing structure 32. The cantilever bearing structure 32 can also be referred to as a bearing structure 32. The cantilever bearing structure (the bearing structure) 32 rotatably couples the pedal body 14 to the pedal axle 12 about a rotational axis A1. The cantilever bearing structure 32 is provided closer to the first axle end 16 than the tread surface 18 along the rotational axis A1. The cantilever bearing structure 32 is provided between the first axle end 16 and the tread surface 18 along the rotational axis A1. The tread surface 18 is provided between the rotational axis A1 and the additional surface 20.

As seen in FIG. 2, the rotational axis A1 is provided on the pedal opening 22 when viewed in a perpendicular direction D2 (FIG. 1) perpendicular to the tread surface 18. However, the rotational axis A1 can be provided outside the pedal opening 22 when viewed in the perpendicular direction D2.

As seen in FIG. 3, the cantilever bearing structure (the bearing structure) 32 comprises a first bearing 34 having at least two rows. In this embodiment, the first bearing 34 has two rows. However, the first bearing 34 can have three of more rows.

The cantilever bearing structure (the bearing structure) 32 comprises a second bearing 36 having at least one row. In this embodiment, the second bearing 36 has two rows. However, the second bearing 36 can have one row or at least three rows.

At least part of the first bearing 34 is provided radially outwardly of the second bearing 36. In this embodiment, the first bearing 34 is entirely provided radially outwardly of the second bearing 36. However, the first bearing 34 can be partly provided radially outwardly of the second bearing 36. The first bearing 34 can be provided radially inwardly of the second bearing 36. The bearing support 27 is provided radially between the first bearing 34 and the second bearing 36. The first bearing 34 is provided radially outwardly of the bearing support 27. The second bearing 36 is provided radially inwardly of the bearing support 27.

Figure 4:
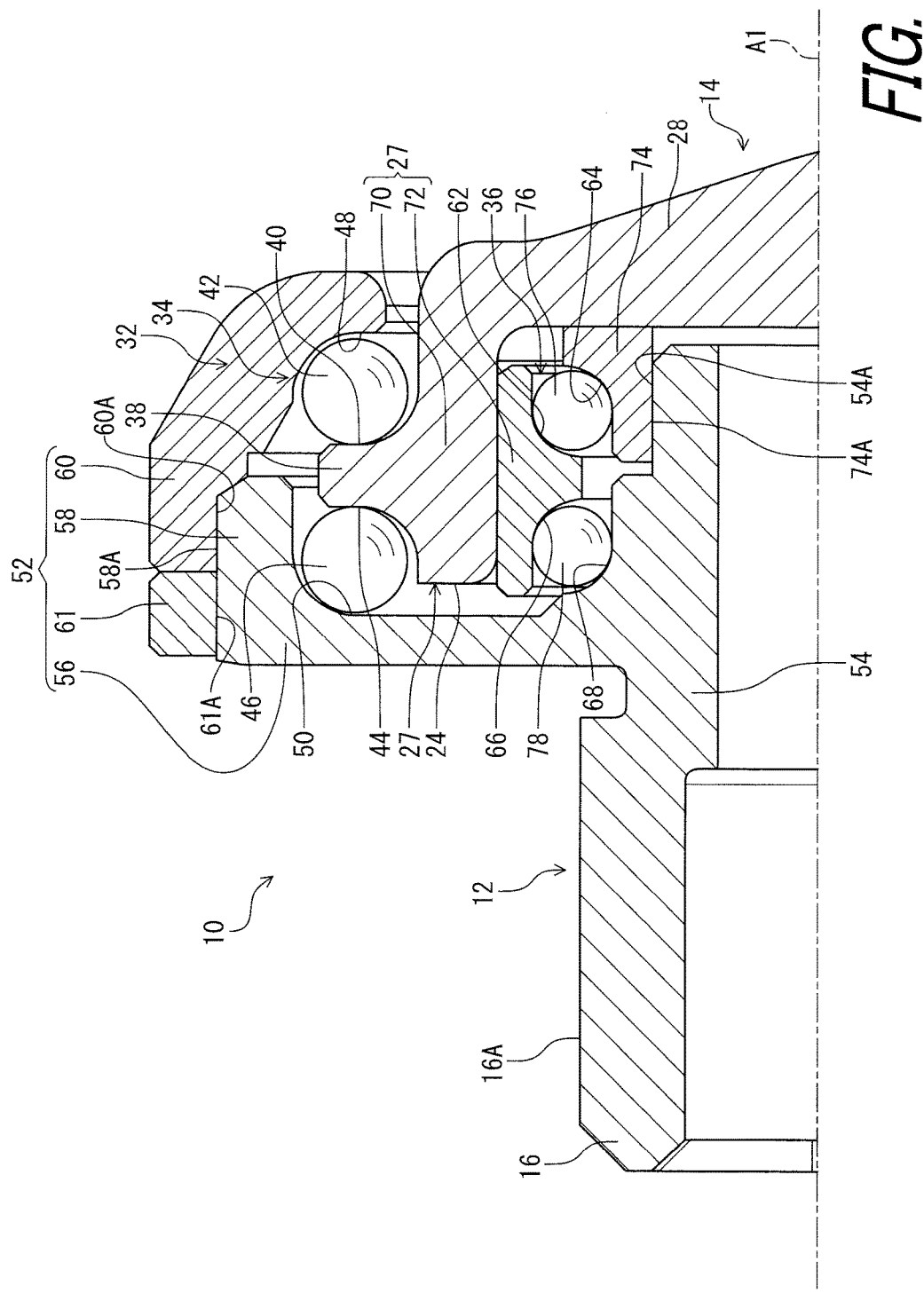
FIG. 4 is an enlarged cross-sectional view of the bicycle pedal illustrated in FIG. 1.

As seen in FIG. 4, the pedal body 14 includes a first thrust receiving part 38 extending radially outwardly from the bearing support 27. The first bearing 34 includes a first thrust receiving surface 40. The first thrust receiving surface 40 is provided on the first thrust receiving part 38. The first bearing 34 includes first thrust rolling elements 42 constituting a single row. The first thrust rolling elements 42 contact the first thrust receiving surface 40. A single row of a bearing is defined by a common rotational orbit on which rolling elements (e.g., the first thrust rolling elements 42) moves circumferentially about a rotational axis of the bearing.

The first bearing 34 includes a second thrust receiving surface 44 provided on a reverse side of the first thrust receiving surface 40. The second thrust receiving surface 44 is provided on the first thrust receiving part 38. The first bearing 34 includes second thrust rolling elements 46 constituting a single row. The second thrust rolling elements 46 contact the second thrust receiving surface 44.

The first bearing 34 includes a first additional thrust receiving surface 48 and a second additional thrust receiving surface 50. The first thrust rolling elements 42 contact the first additional thrust receiving surface 48. The second thrust rolling elements 46 contact the second additional thrust receiving surface 50. The first additional thrust receiving surface 48 and the second additional thrust receiving surface 50 are provided on the pedal axle 12.

The pedal axle 12 includes a second thrust receiving part 52 provided radially outwardly of the first bearing 34. The pedal axle 12 includes an axle body 54 including the first axle end 16. The second thrust receiving part 52 extends radially outwardly from the axle body 54. The first additional thrust receiving surface 48 and the second additional thrust receiving surface 50 are provided on the second thrust receiving part 52.

In this embodiment, the second thrust receiving part 52 includes a flange 56, a tubular portion 58, a cover 60, and a lock ring 61. The flange 56 extends radially outwardly from the axle body 54. The tubular portion 58 extends from the flange 56 in the axial direction D1. The flange 56 and the tubular portion 58 are integrally provided with the axle body 54 as a one-piece unitary member. The cover 60 is a separate member from the tubular portion 58 and is attached to the tubular portion 58. The first additional thrust receiving surface 48 is provided on the cover 60. The second additional thrust receiving surface 50 is provided on the flange 56. The tubular portion 58 includes an externally threaded part 58A. The cover 60 includes an internally threaded part 60A threadedly engaged with the externally threaded part 58A. The lock ring 61 is a separate member from the tubular portion 58 and the cover 60 and is attached to the tubular portion 58. The lock ring 61 includes an internally threaded part 61A threadedly engaged with the externally threaded part 58A.

Figure 5:
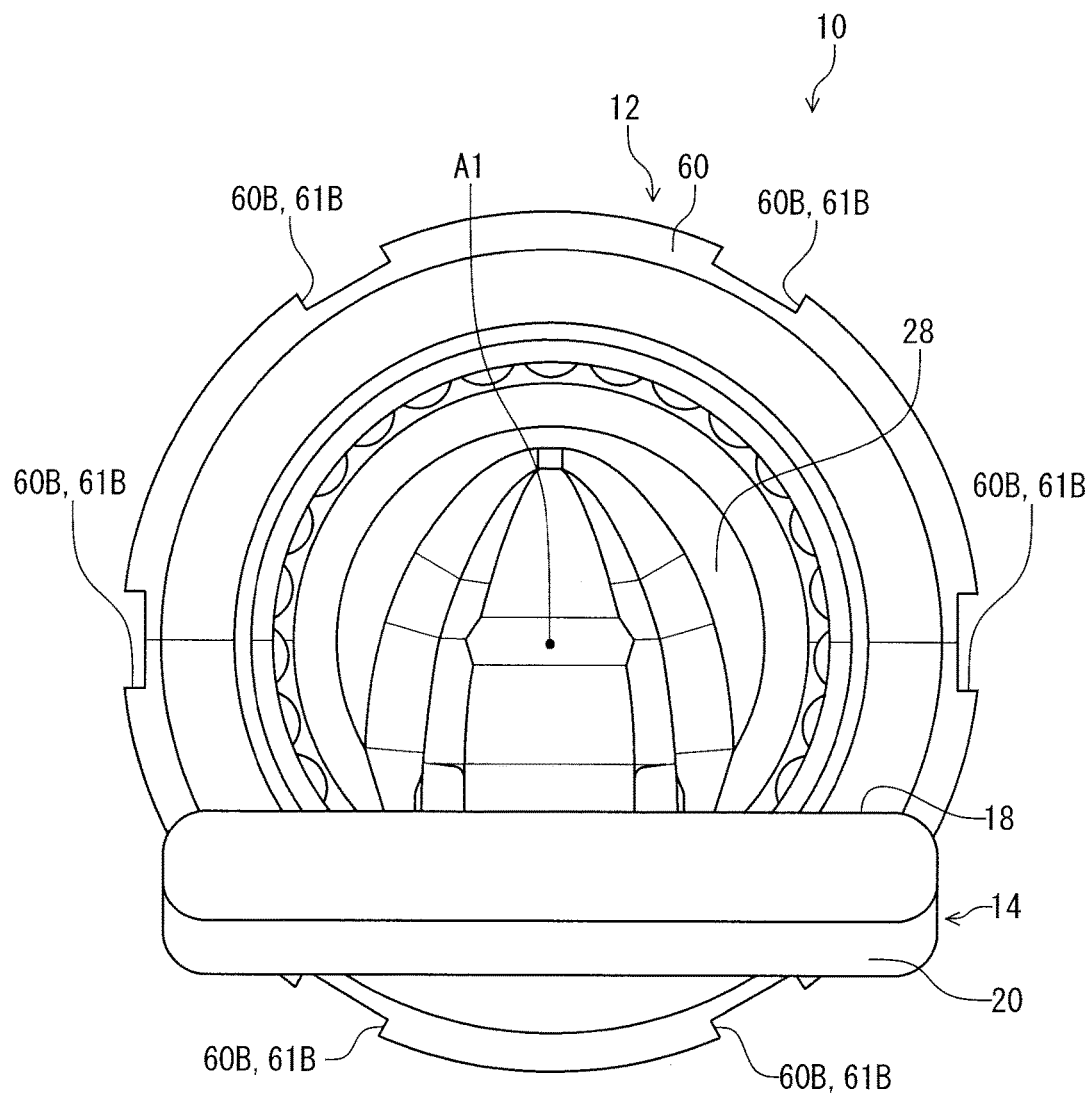
FIG. 5 is a front view of the bicycle pedal illustrated in FIG. 1.

As seen in FIG. 5, the cover 60 has an annular shape. The cover 60 includes grooves 60B arranged circumferentially at a constant pitch. As seen in FIGS. 1 and 5, the lock ring 61 includes grooves 61B arranged circumferentially at a constant pitch.

Figure 6:
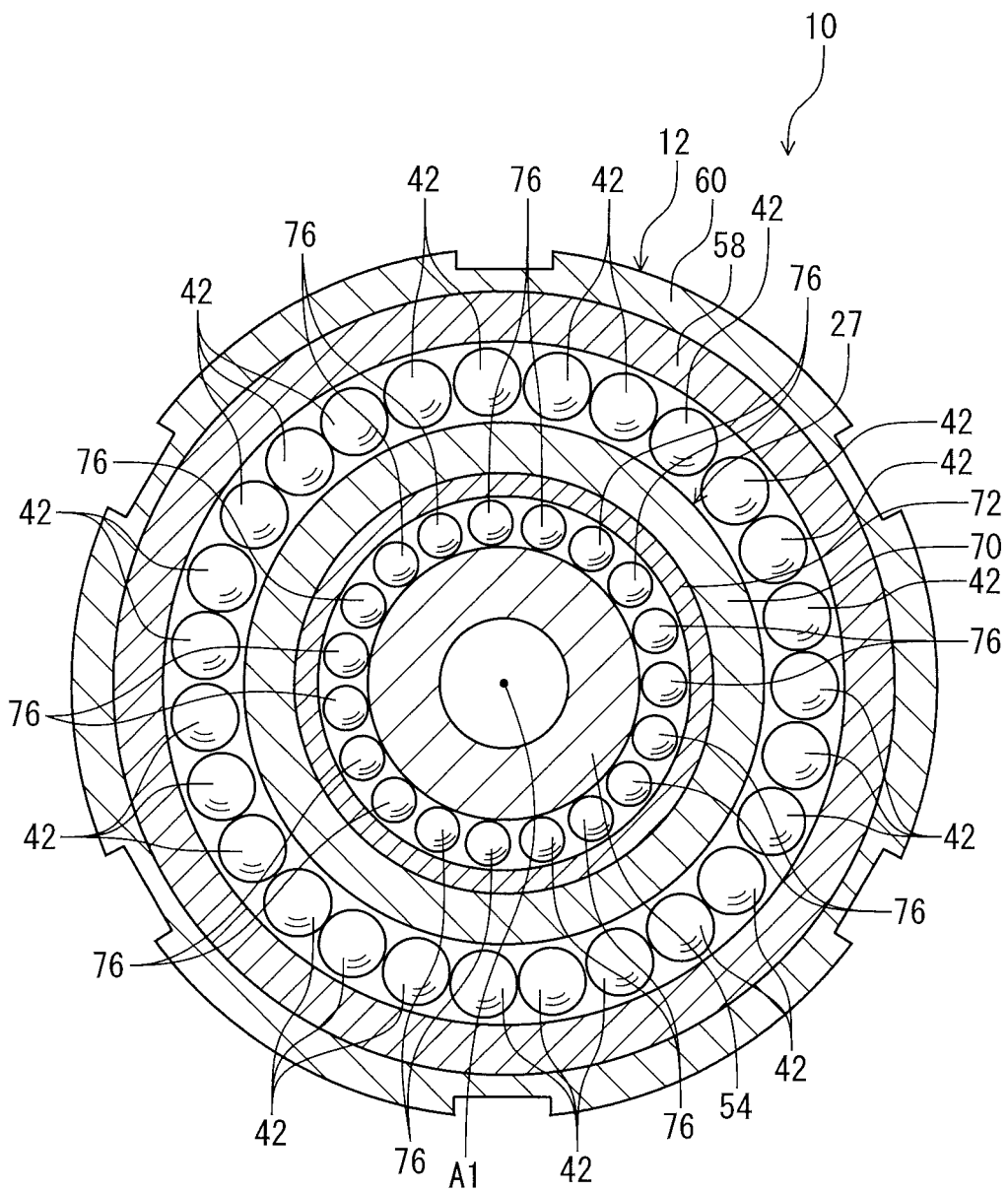
FIG. 6 is a cross-sectional view of the bicycle pedal taken along line VI-VI of FIG. 3.

As seen in FIG. 6, the first thrust rolling elements 42 are circumferentially arranged. In this embodiment, the first thrust rolling element includes a ball. However, the structure of the first thrust rolling elements 42 is not limited to this embodiment.

Figure 7:
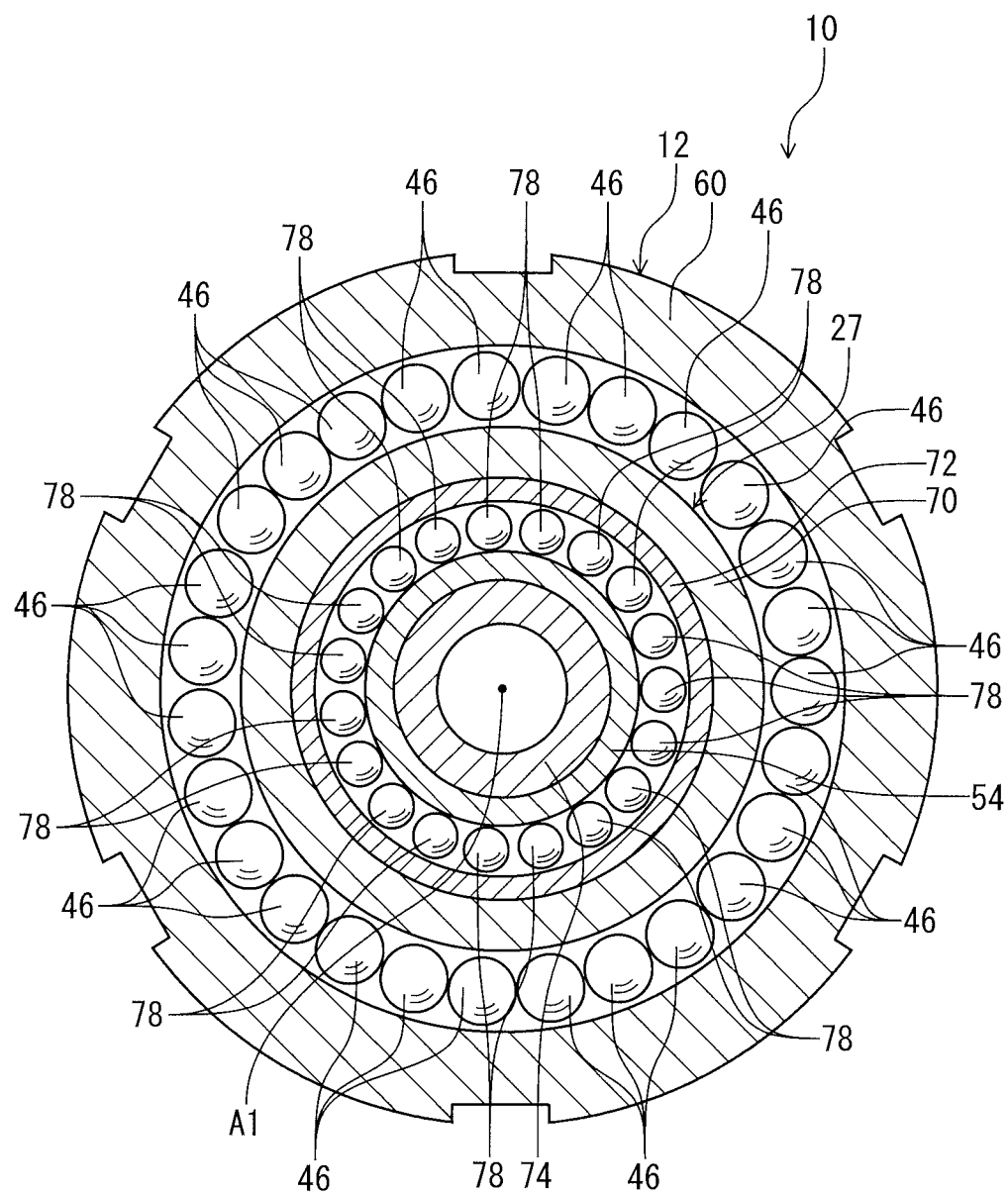
FIG. 7 is a cross-sectional view of the bicycle pedal taken along line VII-VII of FIG. 3.

As seen in FIG. 7, the second thrust rolling elements 46 are circumferentially arranged. In this embodiment, the second thrust rolling element includes a ball. However, the structure of the second thrust rolling elements 46 is not limited to this embodiment.

As seen in FIG. 4, the second bearing 36 includes a first radial receiving surface 62. In this embodiment, the first radial receiving surface 62 is provided on the pedal body 14. The first radial receiving surface 62 is provided on the bearing support 27. The second bearing 36 includes a first additional radial receiving surface 64. The first additional radial receiving surface 64 is provided on the pedal axle 12 and provided radially inwardly of the first radial receiving surface 62.

The second bearing 36 includes a second radial receiving surface 66. In this embodiment, the second radial receiving surface 66 is provided on the pedal body 14. The second radial receiving surface 66 is provided on the bearing support 27. The second additional radial receiving surface 68 is provided on the pedal axle 12. The second additional radial receiving surface 68 is provided radially inwardly of the second radial receiving surface 66.

The bearing support 27 includes a first support 70 and a second support 72. The second support 72 is a separate member from the first support 70. The first support 70 has a tubular shape and extends from the coupling part 28 in the axial direction D1. The second support has a tubular shape and is provided radially inwardly of the first support 70. The second support 72 is not secured to the first support 70. The first radial receiving surface 62 and the second radial receiving surface 66 are provided on the second support 72.

The pedal axle 12 includes a stopper 74 secured to the axle body 54. The stopper 74 is a separate member from the axle body 54. The stopper 74 includes a threaded hole 74A. The axle body 54 includes an externally threaded part 54A threadedly engaged with the threaded hole 74A. The first additional radial receiving surface 64 is provided on the axle body 54. The second additional radial receiving surface 68 is provided on the stopper 74.

Each of the first radial receiving surface 62 and the first additional radial receiving surface 64 is provided closer to the first axle end 16 than the tread surface 18 along the rotational axis A1. Each of the second radial receiving surface 66 and the second additional radial receiving surface 68 is provided closer to the first axle end 16 than the tread surface 18 along the rotational axis A1.

The second bearing 36 includes first radial rolling elements 76 constituting a single row. The first radial rolling elements 76 are provided between the first radial receiving surface 62 and the first additional radial receiving surface 64. The first radial rolling elements 76 contact the first radial receiving surface 62. The first radial rolling elements 76 contact the first additional radial receiving surface 64.

The second bearing 36 includes second radial rolling elements 78 constituting a single row. The second radial rolling elements 78 are provided between the second radial receiving surface 66 and the second additional radial receiving surface 68. The second radial rolling elements 78 contact the second radial receiving surface 66. The second radial rolling elements 78 contact the second additional radial receiving surface 68.

As seen in FIG. 6, the first radial rolling elements 76 are circumferentially arranged. In this embodiment, the first radial rolling element includes a ball. However, the structure of the first radial rolling elements 76 is not limited to this embodiment.

As seen in FIG. 7, the second radial rolling elements 78 are circumferentially arranged. In this embodiment, the second radial rolling element includes a ball. However, the structure of the second radial rolling elements 78 is not limited to this embodiment.

Figure 8:
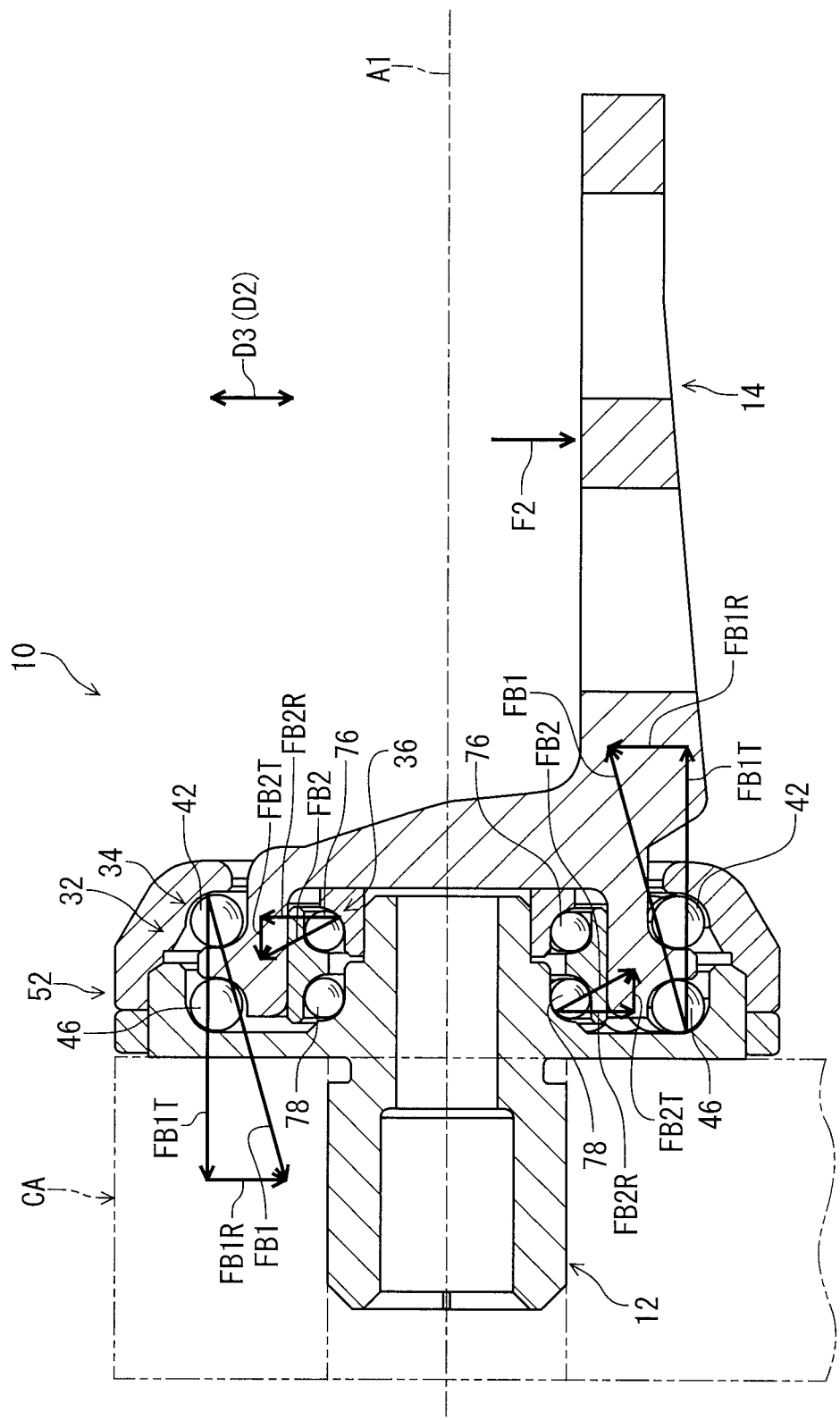
FIG. 8 is a cross-sectional view of the bicycle pedal for illustrating a first thrust load ratio, a first radial load ratio, a second thrust load ratio, and a second radial load ratio.

As seen in FIG. 8, the first bearing 34 has a first radial load ratio (FB1R/FB1) and a first thrust load ratio (FB1T/FB1). In this embodiment, the first bearing 34 has the first radial load ratio (FB1R/FB1) and the first thrust load ratio (FB1T/FB1) on each row. The first radial load ratio (FB1R/FB1) is defined in a radial direction D3 perpendicular to the rotational axis A1. The first thrust load ratio (FB1T/FB1) is defined in the axial direction D1 parallel to the rotational axis A1. The first thrust load ratio (FB1T/FB1) is larger than the first radial load ratio (FB1R/FB1).

In this embodiment, the first radial load ratio (FB1R/FB1) is a ratio of a radial component FB1R of a first bearing force FB1 to the first bearing force FB1. The first thrust load ratio (FB1T/FB1) is a ratio of a thrust component FB1T of the first bearing force FB1 to the first bearing force FB1. The first bearing force FB1 is applied to the first bearing 34 when a reference tread force F2 is applied to the pedal body 14 in the perpendicular direction D2. The radial component FB1R is defined in the radial direction D3. The thrust component FB1T is defined in the axial direction D1. For example, the first radial load ratio (FB1R/FB1) is 0.2587. The first thrust load ratio (FB1T/FB1) is 0.9661.

The second bearing 36 has a second radial load ratio (FB2R/FB2) and a second thrust load ratio (FB2T/FB2). In this embodiment, the second bearing 36 has the second radial load ratio (FB2R/FB2) and the second thrust load ratio (FB2T/FB2) on each row. The second radial load ratio (FB2R/FB2) is defined in the radial direction D3. The second thrust load ratio (FB2T/FB2) is defined in the axial direction D1. The second radial load ratio (FB2R/FB2) is larger than the second thrust load ratio (FB2T/FB2).

In this embodiment, the second radial load ratio (FB2R/FB2) is a ratio of a radial component FB2R of a second bearing force FB2 to the second bearing force FB2. The second thrust load ratio (FB2T/FB2) is a ratio of a thrust component FB2T of the second bearing force FB2 to the second bearing force FB2. The second bearing force FB2 is applied to the second bearing 36 when the reference tread force F2 is applied to the pedal body 14 in the perpendicular direction D2. The radial component FB2R is defined in the radial direction D3. The thrust component FB2T is defined in the axial direction D1. For example, the second radial load ratio (FB2R/FB2) is 0.9057. The second thrust load ratio (FB2T/FB2) is 0.4221.

In this embodiment, a ratio (FB1T/FB1R) of the first thrust load ratio (FB1T/FB1) to the first radial load ratio (FB1R/FB1) is equal to or higher than 2.5. In this embodiment, the ratio (FB1T/FB1R) of the first thrust load ratio (FB1T/FB1) to the first radial load ratio (FB1R/FB1) is equal to or higher than 2.5 at each row. A ratio (FB2R/FB2T) of the second radial load ratio (FB2R/FB2) to the second thrust load ratio (FB2T/FB2) is equal to or higher than 2. In this embodiment, the ratio (FB2R/FB2T) of the second radial load ratio (FB2R/FB2) to the second thrust load ratio (FB2T/FB2) is equal to or higher than 2 at each row. For example, the ratio (FB1T/FB1R) is 3.73 at each row. The ratio (FB2R/FB2T) is 2.15 at each row. However, the value of the ratio (FB1T/FB1R) and/or (FB2R/FB2T) is not limited to this embodiment.

Second Embodiment

A bicycle pedal 210 in accordance with a second embodiment will be described below referring to FIG. 9. The bicycle pedal 210 has the same structure as that of the bicycle pedal 10 except for the second bearing 36. Thus, elements having substantially the same function as those in the first embodiment will be numbered the same here, and will not be described and/or illustrated again in detail here for the sake of brevity.

Figure 9:
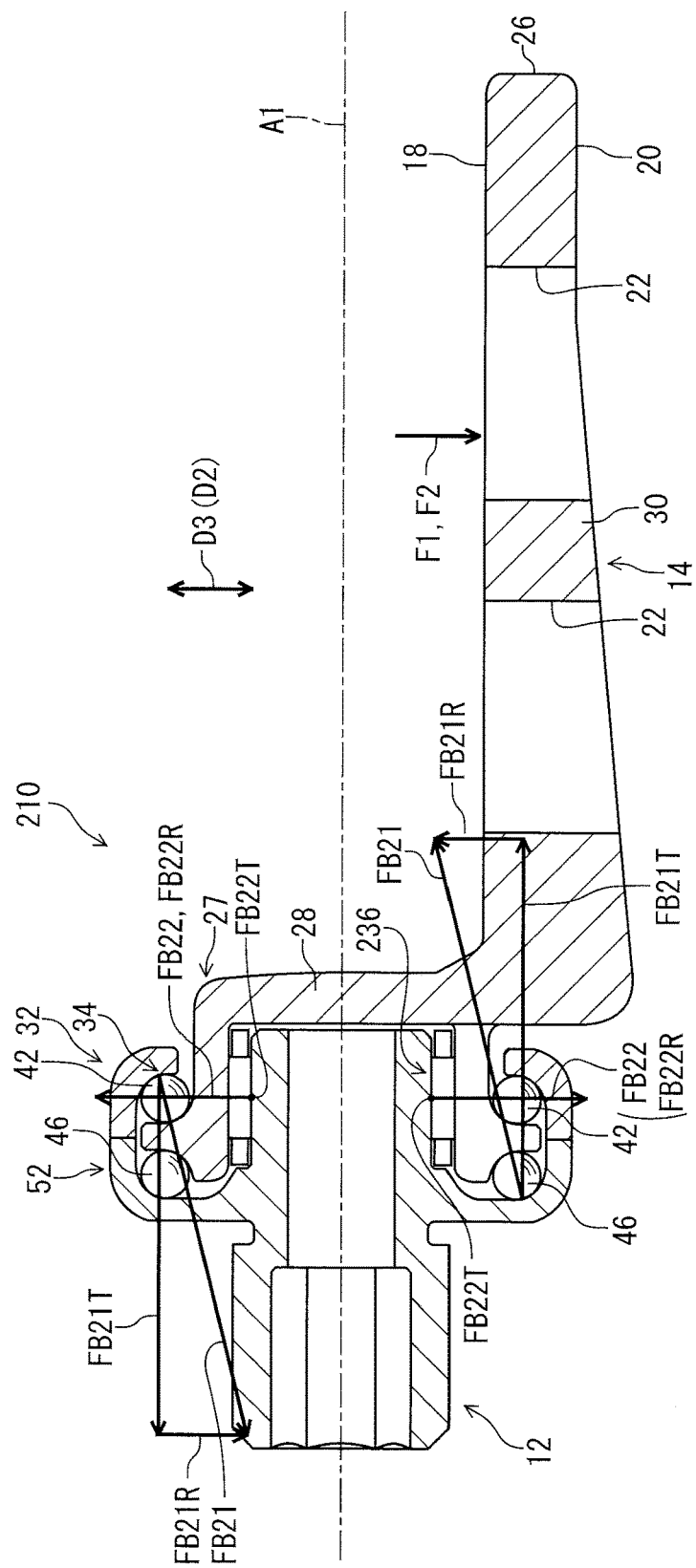
FIG. 9 is a cross-sectional view of a bicycle pedal in accordance with a second embodiment.
Figure 10:
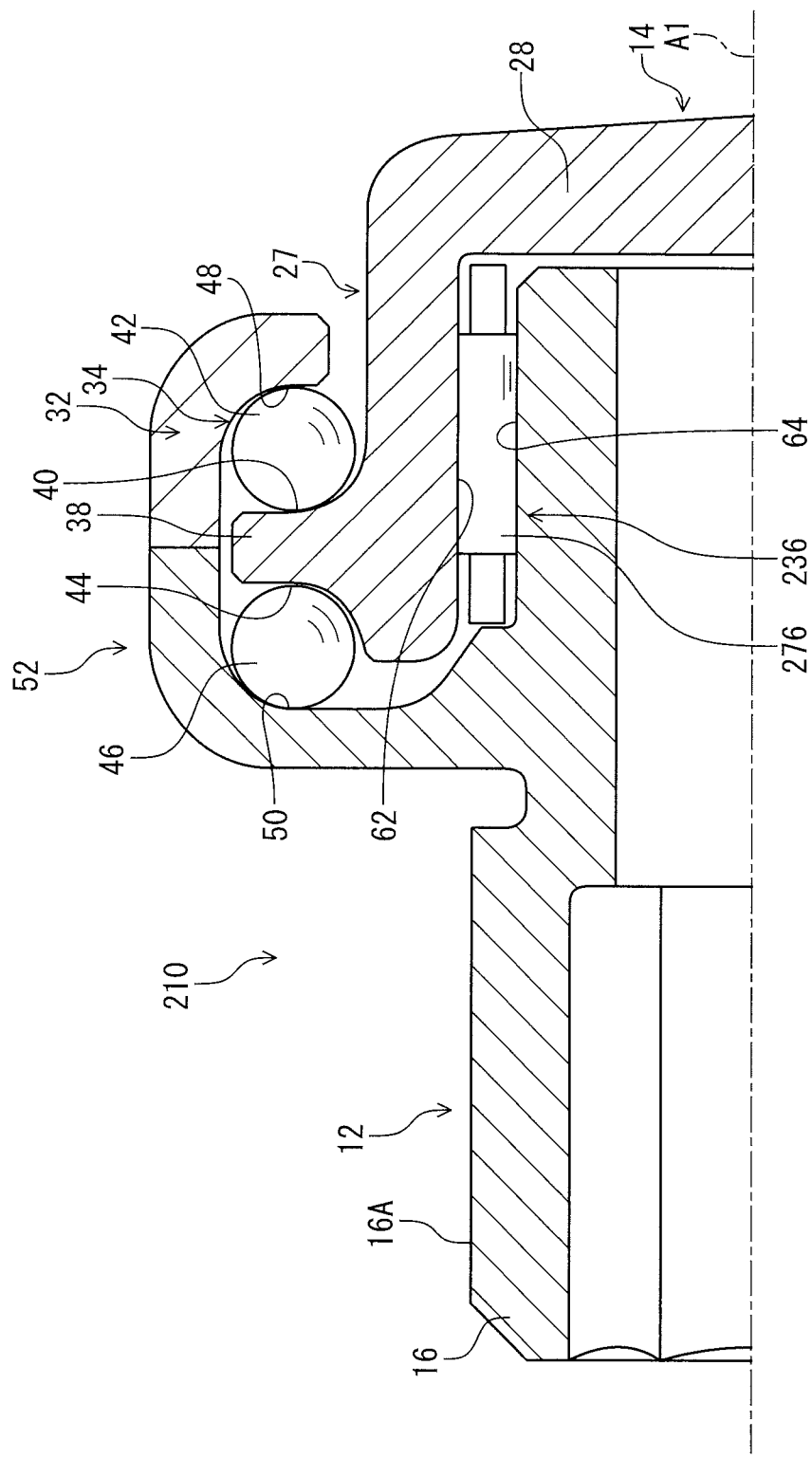
FIG. 10 is an enlarged cross-sectional view of the bicycle pedal illustrated in FIG. 9.

As seen in FIGS. 9 and 10, the bicycle pedal 210 comprises a second bearing 236 having at least one row. In this embodiment, the second bearing 236 has one row. The second bearing 236 includes a needle bearing having at least one row.

As seen in FIG. 10, the second bearing 236 includes first radial rolling elements 276 constituting a single row. The first radial rolling element 276 includes a roller. The first radial rolling elements 276 contact the first radial receiving surface 62 and the first additional radial receiving surface 64. In this embodiment, the second radial rolling elements 78, the second radial receiving surface 66, and the second additional radial receiving surface 68 are omitted from the bicycle pedal 210.

As seen in FIG. 9, the second bearing 36 has a second radial load ratio (FB22R/FB22) and a second thrust load ratio (FB22T/FB22). The second radial load ratio (FB22R/FB22) is defined in the radial direction D3. The second thrust load ratio (FB22T/FB22) is defined in the axial direction D1. The second radial load ratio (FB22R/FB22) is larger than the second thrust load ratio (FB22T/FB22).

In this embodiment, the second radial load ratio (FB22R/FB22) is a ratio of a radial component FB22R of a second bearing force FB22 to the second bearing force FB22. The second thrust load ratio (FB22T/FB22) is a ratio of a thrust component FB22T of the second bearing force FB22 to the second bearing force FB22. The second bearing force FB22 is applied to the second bearing 36 when the reference tread force F2 is applied to the pedal body 14 in the perpendicular direction D2. The radial component FB22R is defined in the radial direction D3. The thrust component FB22T is defined in the axial direction D1. For example, the second radial load ratio (FB22R/FB22) is 1.0. The second thrust load ratio (FB22T/FB22) is zero.

In this embodiment, a ratio (FB1T/FB1R) of the first thrust load ratio (FB1T/FB1) to the first radial load ratio (FB1R/FB1) is equal to or higher than 2.5. A ratio (FB22R/FB22T) of the second radial load ratio (FB22R/FB22) to the second thrust load ratio (FB22T/FB22) is equal to or higher than 2 For example, the ratio (FB1T/FB1R) is 3.73 at each row. The ratio (FB22R/FB22T) is infinity. However, the value of the ratio (FB1T/FB1R) and/or (FB22R/FB22T) is not limited to this embodiment.

Third Embodiment

A bicycle pedal 310 in accordance with a second embodiment will be described below referring to FIGS. 11 to 13. The bicycle pedal 310 has the same structure as that of the bicycle pedal 10 except for the second bearing 36. Thus, elements having substantially the same function as those in the first embodiment will be numbered the same here, and will not be described and/or illustrated again in detail here for the sake of brevity.

Figure 11:
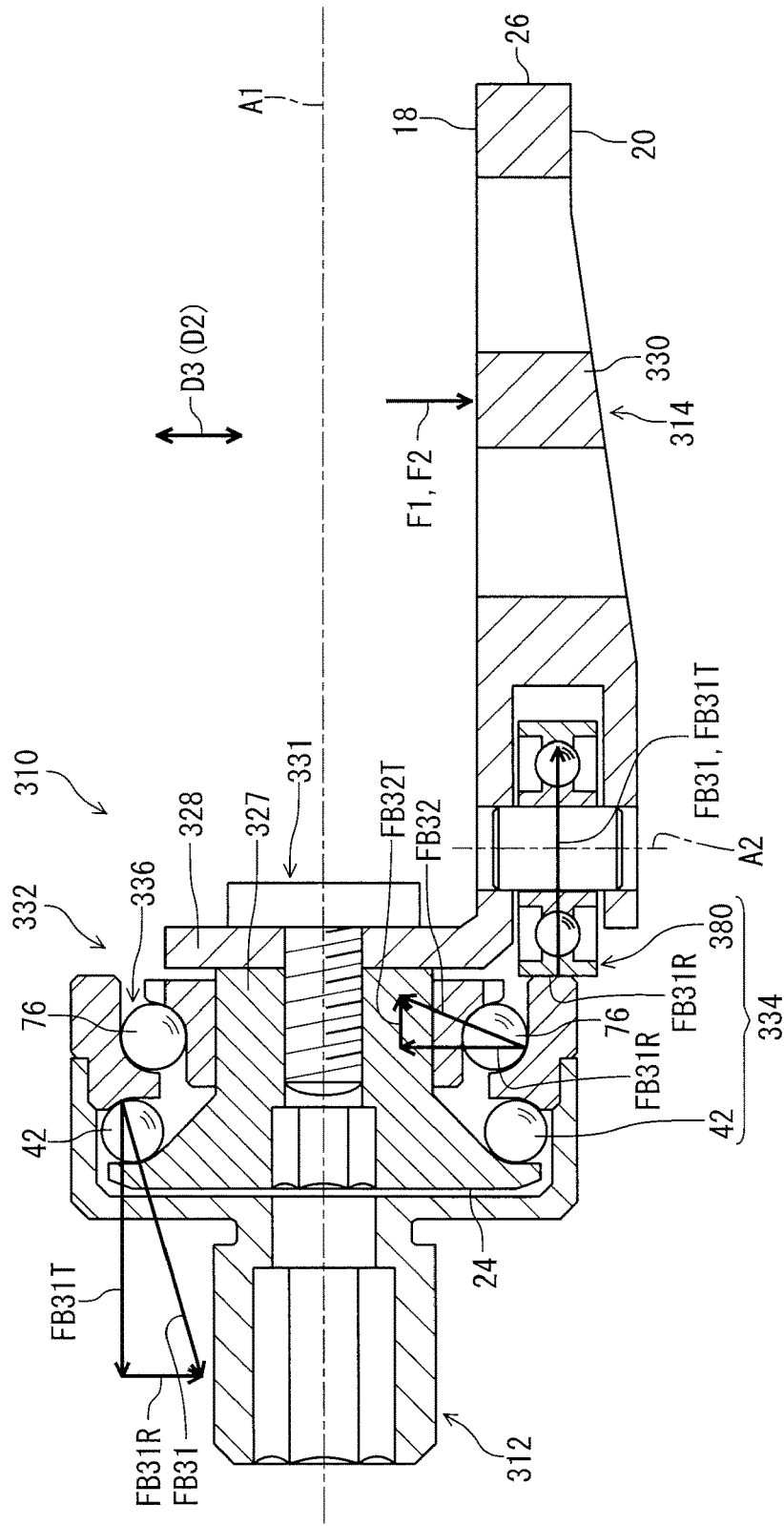
FIG. 11 is a cross-sectional view of a bicycle pedal in accordance with a third embodiment.

As seen in FIG. 11, a bicycle pedal 310 comprises a pedal axle 312 and a pedal body 314 rotatably coupled to the pedal axle 312. The pedal axle 312 has substantially the same structure as that of the pedal axle 12 of the first embodiment. The pedal body 314 has substantially the same structure as that of the pedal body 14 of the first embodiment.

The bicycle pedal 310 comprises a cantilever bearing structure 332. The cantilever bearing structure 332 rotatably couples the pedal body 314 to the pedal axle 312 about the rotational axis A1. The cantilever bearing structure 332 is provided closer to the first axle end 16 than the tread surface 18 along the rotational axis A1.

The cantilever bearing structure 332 comprises a first bearing 334 having at least two rows. In this embodiment, the first bearing 334 has two rows. However, the first bearing 334 can have three of more rows.

The cantilever bearing structure 332 comprises a second bearing 336 having at least one row. In this embodiment, the second bearing 336 has a single row. However, the second bearing 36 can have at least two rows.

As seen in FIG. 11, the pedal body 314 includes a bearing support 327, a coupling part 328, a tread part 330, and a fastener 331. The bearing support 327 includes a tubular part 327A and a stopper 327B. The stopper 327B is secured to the tubular part 327A. The bearing support 327 extends from the coupling part 328 in the axial direction D1. The tread part 330 extends from the coupling part 328 in the axial direction D1. The coupling part 328 is integrally provided with the tread part 330 as a one-piece unitary member. The coupling part 328 is a separate member from the bearing support 327. The bearing support 327 is coupled to the coupling part 328 with the fastener 331 such as a screw. The bearing support 327 includes the first pedal end 24. The tread part 330 includes the tread surface 18, the additional surface 20, and the second pedal end 26.

Figure 12:
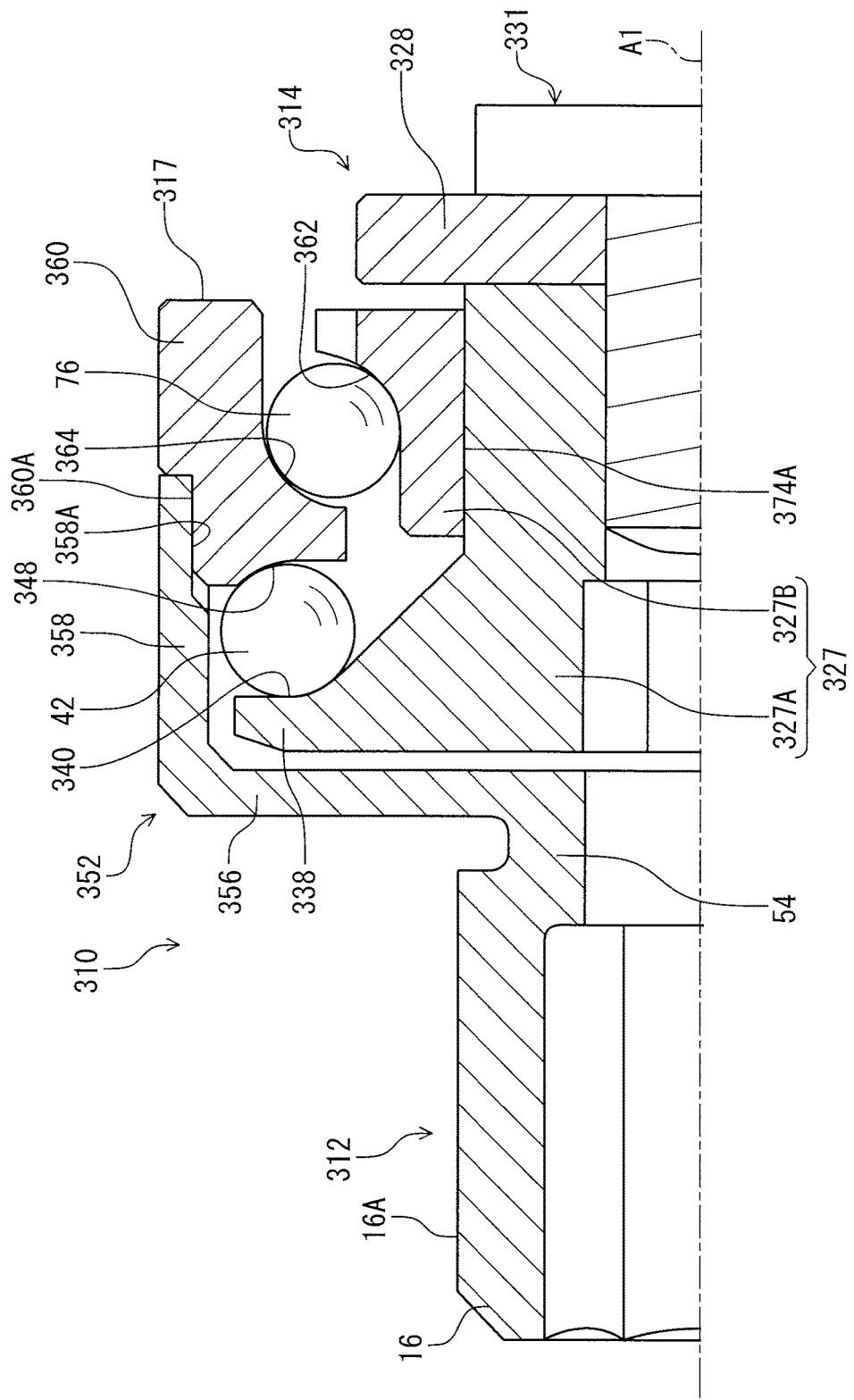
FIG. 12 is an enlarged cross-sectional view of the bicycle pedal illustrated in FIG. 11.

As seen in FIG. 12, the pedal body 314 includes a first thrust receiving part 338 extending radially outwardly from the bearing support 327. The first bearing 334 includes a first thrust receiving surface 340. The first thrust receiving surface 340 is provided on the first thrust receiving part 338. The first bearing 334 includes the first thrust rolling elements 42 constituting a single row. The first thrust rolling elements 42 contact the first thrust receiving surface 340.

The first bearing 334 includes a first additional thrust receiving surface 348. The first additional thrust receiving surface 348 is provided on the pedal body 312. The first thrust rolling elements 42 contact the first additional thrust receiving surface 348. The second thrust rolling elements 46 contact the second additional thrust receiving surface 50.

The pedal axle 312 includes a second thrust receiving part 352 provided radially outwardly of the first bearing 334. The second thrust receiving part 352 extends radially outwardly from the axle body 54. The first additional thrust receiving surface 348 is provided on the second thrust receiving part 352.

In this embodiment, the second thrust receiving part 352 includes a flange 356, a tubular portion 358, and a cover 360. The flange 356 extends radially outwardly from the axle body 54. The tubular portion 358 extends from the flange 356 in the axial direction D1. The flange 356 and the tubular portion 358 are integrally provided with the axle body 54 as a one-piece unitary member. The cover 360 is a separate member from the tubular portion 358 and is attached to the tubular portion 358. The first additional thrust receiving surface 348 is provided on the flange 356. The first additional thrust receiving surface 348 is provided on the cover 360. The tubular portion 358 includes an internally threaded part 358A. The cover 360 includes an externally threaded part 361A threadedly engaged with the externally threaded part 358A.

As seen in FIG. 12, the second bearing 336 includes a first radial receiving surface 362. In this embodiment, the first radial receiving surface 362 is provided on the pedal body 314. The first radial receiving surface 362 is provided on the bearing support 327. The first radial receiving surface 362 is provided on the stopper 327B of the bearing support 327. The second bearing 36 includes a first additional radial receiving surface 364. The first additional radial receiving surface 364 is provided on the cover 360 of the second thrust receiving part 352. The first additional radial receiving surface 364 is provided on the pedal axle 312 and provided radially outwardly of the first radial receiving surface 362.

Each of the first radial receiving surface 362 and the first additional radial receiving surface 364 is provided closer to the first axle end 16 than the tread surface 18 along the rotational axis A1. Each of the second radial receiving surface 66 and the second additional radial receiving surface 68 is provided closer to the first axle end 16 than the tread surface 18 along the rotational axis A1.

The second bearing 336 includes the first radial rolling elements 76 constituting a single row. The first radial rolling elements 76 is provided between the first radial receiving surface 362 and the first additional radial receiving surface 364. The first radial rolling elements 76 contact the first radial receiving surface 362. The first radial rolling elements 76 contact the first additional radial receiving surface 364.

As seen in FIG. 11, the first bearing 334 includes a thrust support member 380. Namely, the bicycle pedal 310 comprises the thrust support member 380. The thrust support member 380 is attached to one of the pedal axle 312 and the pedal body 314. The thrust support member 380 is coupled to one of the pedal axle 312 and the pedal body 314 to be contactable with the other of the pedal axle 312 and the pedal body 314 during pedaling. The thrust support member 380 is rotatably coupled to the one of the pedal axle 312 and the pedal body 314. The thrust support member 380 is rotatably coupled to the one of the pedal axle 312 and the pedal body 314 about a thrust rotational axis A2. The thrust rotational axis A2 is non-parallel to the rotational axis A1.

In this embodiment, the thrust support member 380 is attached to the pedal body 314. The thrust support member 380 is coupled to the pedal body 314 to be contactable with the pedal axle 312 during pedaling. The thrust support member 380 is rotatably coupled to the pedal body 314 to be contactable with the pedal axle 312. The thrust support member 380 is rotatably coupled to the pedal body 314 about the thrust rotational axis A2. However, the thrust support member 380 can be coupled to the pedal axle 312 to be contactable with the pedal body 314 during pedaling. The thrust support member 380 can be rotatably coupled to the pedal axle 312 about the thrust rotational axis A2.

The thrust support member 380 is a separate member from at least one of the pedal axle 312 and the pedal body 314. The thrust support member 380 is a separate member from the pedal axle 312 and the pedal body 314. However, the thrust support member 380 can be integrally provided with one of the pedal axle 312 and the pedal body 314 as a one-piece unitary member.

The pedal body 314 includes a second axle end 317 and extends between the first axle end 16 and the second axle end 317 along the rotational axis A1. The thrust support member 380 is contactable with the second axle end 317. The thrust support member 380 is provided closer to the additional surface 20 than the tread surface 18. However, the arrangement of the thrust support member 380 is not limited to this embodiment.

Figure 13:
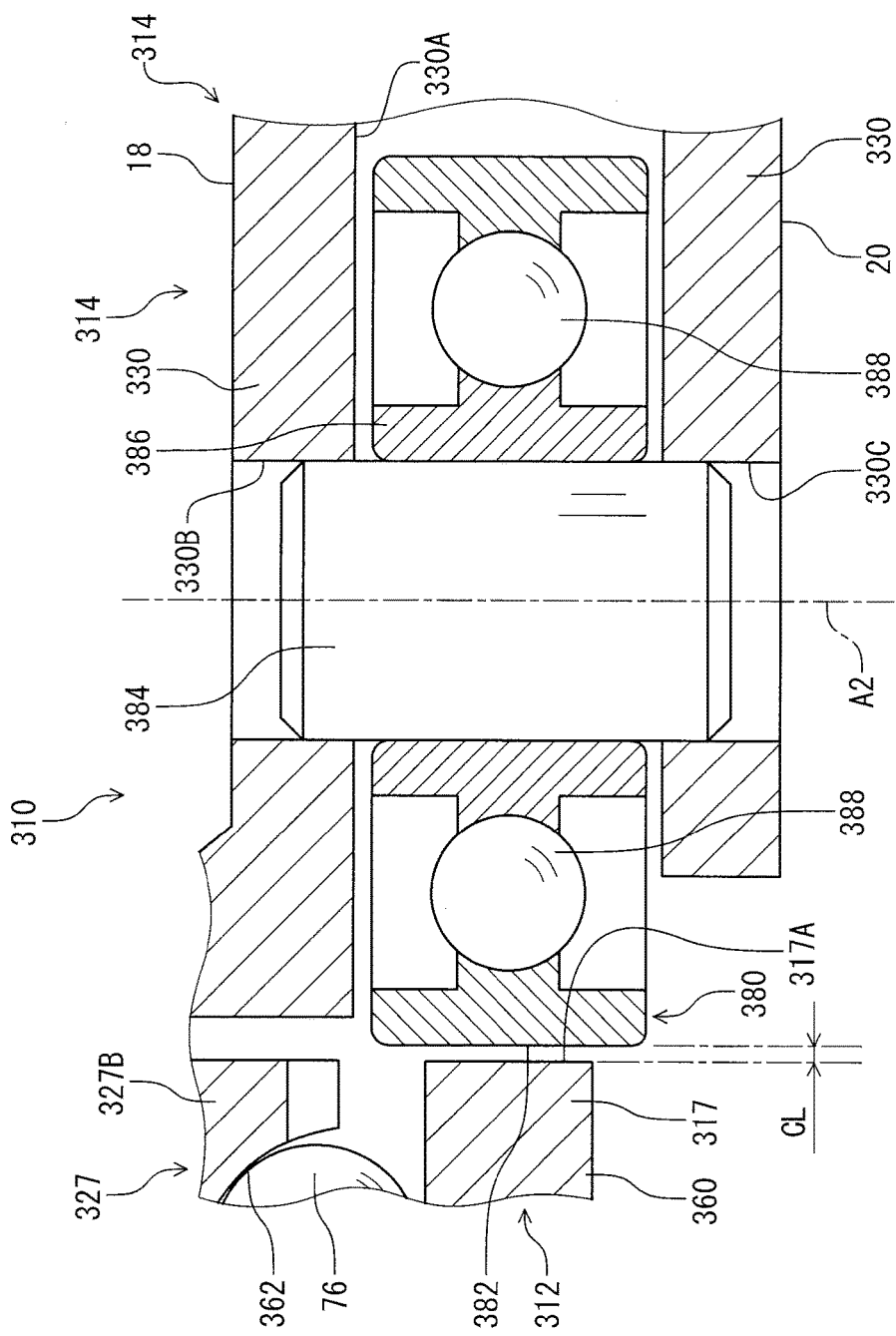
FIG. 13 is another enlarged cross-sectional view of the bicycle pedal illustrated in FIG. 11.

As seen in FIG. 13, the thrust support member 380 is spaced apart from the other of the pedal axle 312 and the pedal body 314 in a state where the tread force F1 (FIG. 11) does not act on the tread surface 18 of the pedal body 314. In this embodiment, the thrust support member 380 is spaced apart from the pedal axle 312 in the state where the tread force F1 (FIG. 11) does not act on the tread surface 18 of the pedal body 314. A clearance CL is provided between the thrust support member 380 and the pedal axle 312 in the state where the tread force F1 (FIG. 11) does not act on the tread surface 18 of the pedal body 314.

The thrust support member 380 includes a contactable surface 382. The contactable surface 382 is contactable with the other of the pedal axle 312 and the pedal body 314. In this embodiment, the contactable surface 382 is contactable with the pedal axle 312. However, the contactable surface 382 can be configured to be contactable with the pedal body 314.

The pedal axle 312 includes a thrust receiving surface 317A provided at the second axle end 317. The contactable surface 382 is contactable with the thrust receiving surface 317A. The thrust support member 380 has a cylindrical shape. The contactable surface 382 constitutes an outer peripheral surface of the thrust support member 380.

The first bearing 334 includes a pin 384, an inner race 386, and additional thrust rolling elements 388. The additional thrust rolling elements 388 constitutes a single row. The tread part 330 includes an accommodation recess 330A, a first hole 330B, and a second hole 330C. The thrust support member 380, the inner race 386, and the additional thrust rolling elements 388 are provided in the accommodation recess 330A. The pin 384 is fitted in the first hole 330B and the second hole 330C. The inner race 386 is attached to the pin 384. The additional thrust rolling elements 388 are provided between the thrust support member 380 and the inner race 386 to rotatably support the thrust support member 380.

As seen in FIG. 11, the first bearing 334 has a first radial load ratio (FB31R/FB31) and a first thrust load ratio (FB31T/FB31). In this embodiment, the first bearing 34 has the first radial load ratio (FB31R/FB31) and the first thrust load ratio (FB31T/FB31) on each row. The first radial load ratio (FB31R/FB31) is defined in the radial direction D3 perpendicular to the rotational axis A1. The first thrust load ratio (FB31T/FB31) is defined in the axial direction D1 parallel to the rotational axis A1. The first thrust load ratio (FB31T/FB31) is larger than the first radial load ratio (FB31R/FB31).

In this embodiment, the first radial load ratio (FB31R/FB31) is a ratio of a radial component FB31R of a first bearing force FB31 to the first bearing force FB31. The first thrust load ratio (FB31T/FB31) is a ratio of a thrust component FB31T of the first bearing force FB31 to the first bearing force FB31. The first bearing force FB31 is applied to the first bearing 334 when the reference tread force F2 is applied to the pedal body 14 in the perpendicular direction D2. The radial component FB31R is defined in the radial direction D3. The thrust component FB31T is defined in the axial direction D1. For example, the first radial load ratio (FB31R/FB31) is 0.2587 at the row constituted by the first thrust rolling elements 42. The first thrust load ratio (FB31T/FB31) is 0.9661 at the row constituted by the first thrust rolling elements 42. The first radial load ratio (FB31R/FB31) is zero at the row constituted by the thrust support member 380. The first thrust load ratio (FB31T/FB31) is 1.0 at the row constituted by the thrust support member 380.

The second bearing 336 has a second radial load ratio (FB32R/FB32) and a second thrust load ratio (FB32T/FB32). The second radial load ratio (FB32R/FB32) is defined in the radial direction D3. The second thrust load ratio (FB32T/FB32) is defined in the axial direction D1. The second radial load ratio (FB32R/FB32) is larger than the second thrust load ratio (FB32T/FB32).

In this embodiment, the second radial load ratio (FB32R/FB32) is a ratio of a radial component FB32R of a second bearing force FB32 to the second bearing force FB32. The second thrust load ratio (FB32T/FB32) is a ratio of a thrust component FB32T of the second bearing force FB32 to the second bearing force FB32. The second bearing force FB32 is applied to the second bearing 36 when the reference tread force F2 is applied to the pedal body 14 in the perpendicular direction D2. The radial component FB32R is defined in the radial direction D3. The thrust component FB32T is defined in the axial direction D1. For example, the second radial load ratio (FB32R/FB32) is 0.9057. The second thrust load ratio (FB32T/FB32) is 0.4221.

In this embodiment, a ratio (FB31T/FB31R) of the first thrust load ratio (FB31T/FB31) to the first radial load ratio (FB31R/FB31) is equal to or higher than 2.5. In this embodiment, the ratio (FB31T/FB31R) of the first thrust load ratio (FB31T/FB31) to the first radial load ratio (FB31R/FB31) is equal to or higher than 2.5 at each row. A ratio (FB32R/FB32T) of the second radial load ratio (FB32R/FB32) to the second thrust load ratio (FB32T/FB32) is equal to or higher than 2. For example, the ratio (FB31T/FB31R) is 3.73 at the row constituted by the first thrust rolling elements 42. The ratio (FB31T/FB31R) is infinity at the row constituted by the thrust support member 380. The ratio (FB32R/FB32T) is 2.15. However, the value of the ratio (FB31T/FB31R) and/or (FB32R/FB32T) is not limited to this embodiment.

In the above embodiments, the bicycle pedal 10 or 210 comprises only the bearing structure 32. The bicycle pedal 310 comprises only the bearing structure 332. However, each of the bicycle pedals 10, 210, and 310 can comprise another bearing.

In the above embodiments, the tread surface 18 is provided between the rotational axis A1 and the additional surface 20. However, the arrangement of the tread surface 18 is not limited to the above embodiments. For example, the rotational axis A1 can be provided between the tread surface 18 and the additional surface 20.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
    a pedal axle including a first axle end configured to be secured to a crank arm;
    a pedal body including a tread surface; and
    a cantilever bearing structure rotatably coupling the pedal body to the pedal axle about a rotational axis, the cantilever bearing structure being provided closer to the first axle end than the tread surface along the rotational axis, the cantilever bearing structure comprising:
        a first bearing having at least two rows, the first bearing having a first radial load ratio and a first thrust load ratio, the first radial load ratio being defined in a radial direction perpendicular to the rotational axis, the first thrust load ratio being defined in an axial direction parallel to the rotational axis, the first thrust load ratio being larger than the first radial load ratio; and
        a second bearing having at least one row, the second bearing having a second radial load ratio and a second thrust load ratio, the second radial load ratio being defined in the radial direction, the second thrust load ratio being defined in the axial direction, the second radial load ratio being larger than the second thrust load ratio.

2. A bicycle pedal comprising:
    a pedal axle;
    a pedal body; and
    a bearing structure rotatably coupling the pedal body to the pedal axle about a rotational axis, the bearing structure comprising:
        a first bearing having a first radial load ratio and a first thrust load ratio, the first radial load ratio being defined in a radial direction perpendicular to the rotational axis, the first thrust load ratio being defined in an axial direction parallel to the rotational axis, a ratio of the first thrust load ratio to the first radial load ratio being equal to or higher than 2.5; and
        a second bearing having a second radial load ratio and a second thrust load ratio, the second radial load ratio being defined in the radial direction, the second thrust load ratio being defined in the axial direction, a ratio of the second radial load ratio to the second thrust load ratio being equal to or higher than 2.

3. The bicycle pedal according to claim 1, wherein the first bearing has two rows.

4. The bicycle pedal according to claim 1, wherein the second bearing includes a needle bearing having at least one row.

5. The bicycle pedal according to claim 1, wherein at least part of the first bearing is provided radially outwardly of the second bearing.

6. The bicycle pedal according to claim 1, wherein the second bearing includes first radial rolling elements, a first radial receiving surface, and a first additional radial receiving surface,
the first radial receiving surface is provided on the pedal body,
the first additional radial receiving surface is provided on the pedal axle and provided radially inwardly of the first radial receiving surface, and
the first radial rolling elements are provided between the first radial receiving surface and the first additional radial receiving surface.

7. The bicycle pedal according to claim 6, wherein each of the first radial receiving surface and the first additional radial receiving surface is provided closer to the first axle end than the tread surface along the rotational axis.

8. The bicycle pedal according to claim 6, wherein the pedal body includes a bearing support,
the first radial receiving surface is provided on the bearing support, and
the bearing support is provided radially between the first bearing and the second bearing.

9. The bicycle pedal according to claim 8, wherein the first bearing includes first thrust rolling elements, a first thrust receiving surface, and a first additional thrust receiving surface,
the pedal body includes a first thrust receiving part extending radially outwardly from the bearing support,
the first thrust receiving surface is provided on the first thrust receiving part, and
the first thrust rolling elements constitutes a single row and contacts the first thrust receiving surface.

10. The bicycle pedal according to claim 9, wherein the first bearing includes second thrust rolling elements, a second thrust receiving surface, and a second additional thrust receiving surface,
the second thrust receiving surface is provided on the first thrust receiving part, and
the second thrust rolling elements constitutes a single row and contacts the second thrust receiving surface.

11. The bicycle pedal according to claim 10, wherein the first additional thrust receiving surface and the second additional thrust receiving surface are provided on the pedal axle.

12. The bicycle pedal according to claim 11, wherein the pedal axle includes a second thrust receiving part provided radially outwardly of the first bearing.

13. The bicycle pedal according to claim 12, wherein the pedal axle includes an axle body including the first axle end, and
the second thrust receiving part extends radially outwardly from the axle body.

14. The bicycle pedal according to claim 12, wherein the first additional thrust receiving surface and the second additional thrust receiving surface are provided on the second thrust receiving part.

15. The bicycle pedal according to claim 1, wherein the first bearing includes first thrust rolling elements constituting a single row.

16. The bicycle pedal according to claim 15, wherein the first bearing includes second thrust rolling elements constituting a single row.

17. The bicycle pedal according to claim 1, wherein the second bearing includes first radial rolling elements constituting a single row.

18. The bicycle pedal according to claim 17, wherein the second bearing includes second radial rolling elements constituting a single row.

19. The bicycle pedal according to claim 1, wherein the first bearing includes a thrust support member attached to one of the pedal axle and the pedal body.

20. The bicycle pedal according to claim 19, wherein the thrust support member is a separate member from at least one of the pedal axle and the pedal body.

21. The bicycle pedal according to claim 19, wherein the thrust support member is rotatably coupled to the one of the pedal axle and the pedal body.

22. The bicycle pedal according to claim 21, wherein the thrust support member is rotatably coupled to the one of the pedal axle and the pedal body about a thrust rotational axis, and
the thrust rotational axis is non-parallel to the rotational axis.

23. The bicycle pedal according to claim 19, wherein the thrust support member is rotatably coupled to the pedal body to be contactable with the pedal axle.

24. The bicycle pedal according to claim 19, wherein the thrust support member is spaced apart from the other of the pedal axle and the pedal body in a state where a tread force does not act on the tread surface of the pedal body.

25. The bicycle pedal according to claim 19, wherein the thrust support member includes a contactable surface contactable with the other of the pedal axle and the pedal body.

26. The bicycle pedal according to claim 19, wherein the pedal body includes a first pedal end and a second pedal end, the pedal body extending between the first pedal end and the second pedal end, and
the first pedal end is closer to the first axle end than the second pedal end.

27. The bicycle pedal according to claim 19, wherein the pedal body includes an additional surface provided on a reverse side of the tread surface, and
the thrust support member is provided closer to the additional surface than the tread surface.

28. The bicycle pedal according to claim 1, wherein the pedal body includes an additional surface provided on a reverse side of the tread surface, and
the tread surface is provided between the rotational axis and the additional surface.

29. The bicycle pedal according to claim 1, wherein the pedal body includes an additional surface provided on a reverse side of the tread surface, and
the pedal body includes a pedal opening extending from the tread surface to the additional surface.

30. The bicycle pedal according to claim 29, wherein the rotational axis is provided on the pedal opening when viewed in a perpendicular direction perpendicular to the tread surface.

* * * * *